(12) United States Patent
Impola et al.

(10) Patent No.: US 11,567,173 B2
(45) Date of Patent: Jan. 31, 2023

(54) SYSTEMS AND METHODS FOR INCREASING LIDAR SENSOR COVERAGE

(71) Applicant: Caterpillar Paving Products Inc., Brooklyn Park, MN (US)

(72) Inventors: Todd A. Impola, Minnetonka, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 386 days.

(21) Appl. No.: 16/809,433

(22) Filed: Mar. 4, 2020

(65) Prior Publication Data
US 2021/0278502 A1   Sep. 9, 2021

(51) Int. Cl.
*G01S 7/481* (2006.01)
*G01S 17/58* (2006.01)
*G01S 17/931* (2020.01)

(52) U.S. Cl.
CPC .............. *G01S 7/481* (2013.01); *G01S 17/58* (2013.01); *G01S 17/931* (2020.01)

(58) Field of Classification Search
CPC ........ G01S 17/58; G01S 17/87; G01S 17/931; G01S 7/481; G01S 7/4817
See application file for complete search history.

(56) References Cited

U.S. PATENT DOCUMENTS

| | | | |
|---|---|---|---|
| 6,317,202 B1 * | 11/2001 | Hosokawa | G01S 17/42 180/169 |
| 9,285,477 B1 | 3/2016 | Smith et al. | |
| 10,018,726 B2 | 7/2018 | Hall et al. | |
| 10,267,635 B2 | 4/2019 | Chen | |
| 11,194,340 B1 * | 12/2021 | Ulrich | G01S 7/4815 |
| 2018/0032822 A1 | 2/2018 | Frank et al. | |
| 2018/0136314 A1 | 5/2018 | Taylor et al. | |
| 2019/0132572 A1 | 5/2019 | Shen et al. | |
| 2019/0195992 A1 * | 6/2019 | Nabbe | G01S 17/86 |
| 2020/0209367 A1 * | 7/2020 | Qiu | G01S 7/4817 |
| 2020/0284883 A1 * | 9/2020 | Ferreira | G01S 7/4817 |
| 2021/0239803 A1 * | 8/2021 | Onda | G01S 17/08 |

FOREIGN PATENT DOCUMENTS

| | | |
|---|---|---|
| EP | 2113790 A1 | 11/2009 |
| WO | WO2018127789 A1 | 7/2018 |

\* cited by examiner

*Primary Examiner* — Timothy X Pham

(57) ABSTRACT

A system for increasing lidar sensor coverage for use by a vehicle is described herein. The system includes a two lidar sensors oriented to emit light beams toward a surface proximate the vehicle. The system also includes at least one mirror associated with each lidar sensor configured to reflect light beams emitted away from the surface. The at least one mirror reflects the light beams toward the surface, thereby increasing lidar sensor coverage associated with the respective lidar sensor. The lidar sensors receive lidar returns, either directly from the surface or reflected off the mirror and may generate sensor data associated with an area proximate the vehicle. A vehicle computing system controls the vehicle based in part on the sensor data.

18 Claims, 7 Drawing Sheets

SYSTEMS AND METHODS FOR INCREASING LIDAR SENSOR COVERAGE

TECHNICAL FIELD

The present disclosure relates to systems and methods for increasing the field of view of a lidar sensor. More specifically, the present disclosure relates to systems and methods for utilizing one or more mirrors to reflect lidar beams from a lidar sensor to detect objects in an area otherwise out of view of the lidar sensor.

BACKGROUND

Autonomous vehicles are becoming increasingly more common in numerous industries, such as construction, mining, rail, forestry, agriculture, waste management, and the like. Autonomous vehicles include multiple sensor systems configured to detect objects proximate to the vehicles. A vehicle computing system receives sensor data from the sensor systems and determine an action for the vehicle to take. For example, an autonomous vehicle operating in a construction zone detects an object proximate the vehicle, and determines to slow down or change course, such as to yield to the object. In such an example, the autonomous vehicle is configured to maximize the field of vision around the machine.

Autonomous vehicles often include lidar sensors to monitor an area proximate the vehicle. Many lidar sensors designed for use on autonomous vehicles emit laser pulses (e.g., light beams) in a 360-degree pattern around the lidar sensor and detect objects based on pulse returns after reflecting off an object. To detect objects in the area proximate the vehicle, oftentimes lidar sensors are angled to emit laser pulses toward the ground in the area proximate the vehicle. This angled orientation of a lidar sensor results in a substantial portion (e.g., 45%, 50%, etc.) of the 360-degree pattern of laser pulses emanating toward the sky (e.g., unused). Due in part to the angled orientation to capture the environment proximate the vehicle, in order to effectively monitor the area, the autonomous vehicle requires a plurality of sensors situated around the vehicle. In at least one example, an autonomous vehicle includes four lidar sensors to monitor the area in front, behind, and on each side of the vehicle. However, the plurality of lidar sensors and increased computing complexity in processing data from each sensor renders the sensor system prohibitively expensive in many industries.

Example embodiments of the present disclosure are directed toward improving upon the lidar sensor coverage described above.

SUMMARY

In an aspect of the present disclosure, an autonomous vehicle includes a first lidar sensor oriented to emit a first set of light beams toward a first area proximate the autonomous vehicle. The first lidar sensor receives first lidar returns (e.g., light beams reflected off a surface of the first area) associated with the first set of light beams. The autonomous vehicle further includes a first mirror configured to reflect at least a portion of a second set of light beams emitted away from the first area toward a second area proximate the autonomous vehicle. The first mirror further reflects second lidar returns from the second area toward the first lidar sensor. The autonomous vehicle further includes a second lidar sensor oriented to capture sensor data representative of a third area proximate the autonomous vehicle. The autonomous vehicle also includes a second mirror configured to reflect light beams emitted away from the third area toward a fourth area proximate the autonomous vehicle. The autonomous vehicle includes a vehicle computing system configured to control the autonomous vehicle based on sensor data associated with at least one of the first area, the second area, the third area, or the fourth area.

In another aspect of the present disclosure, a vehicle includes a first lidar system comprising a first lidar sensor and a first mirror. In such an example, the first lidar sensor is oriented to emit first light beams toward a first area and second light beams away from the first area. The first mirror is coupled to the vehicle a first distance from the first lidar sensor (e.g., 30 centimeters, 50 centimeters, 15 inches, etc.) and oriented to reflect the second light beams toward a second area. The vehicle further includes a second lidar system comprising a second lidar sensor and a second mirror. The second lidar sensor is oriented to emit third light beams toward a third area and fourth light beams away from the third area. The second mirror is coupled to the vehicle a second distance from the second lidar sensor and oriented to reflect the fourth light beams toward a fourth area.

In yet another aspect of the present disclosure, a method includes receiving, from a first lidar sensor, first sensor data associated with a first area proximate a vehicle. In some examples, the first sensor data includes data generated based on first light beams emitted toward the first area. The method further includes receiving, from the first lidar sensor, second sensor data associated with a second area proximate the vehicle. The second sensor data includes data generated based on second light beams emitted away from the first area and reflected off a first mirror located a first distance from the first lidar sensor. In some examples, the method further includes receiving, from a second lidar sensor, third sensor data associated with a third area proximate the vehicle, the third sensor data being generated based on third light beams emitted toward a third area. The method also includes receiving, from the second lidar sensor, fourth sensor data associated with a fourth area proximate the vehicle, the fourth sensor data generated based on fourth light beams emitted away from the third are and reflected off a second mirror located a distance (e.g., spaced) from the second lidar sensor. In some examples, the method additionally includes determining an object proximate the vehicle based at least in part on at least one of the first sensor data, the second sensor data, the third sensor data, or the fourth sensor data.

DETAILED DESCRIPTION

Wherever possible, the same reference numbers will be used throughout the present disclosure to refer to the same or like parts. In example embodiments, the systems and methods described herein may be utilized in order to increase a field of view of one or more lidar sensors. In some examples, data captured by the lidar sensor(s) may be used by a vehicle computing system to control an autonomous vehicle. For example, the vehicle computing system determines that an object is located proximate an autonomous vehicle. The vehicle computing system determines to modify a trajectory associated with a path of the autonomous vehicle, such as to slow down or turn away from, the object in order to avoid an impact therewith. For another example, the vehicle computing system determines an operating boundary (e.g., berm, curb, road edge, demarcation between a previously worked surface and an unworked surface, etc.). The vehicle computing system controls the vehicle based on the operating boundary.

In any of the examples described herein, a field of view associated with an individual lidar sensor is increased, thereby reducing a total number of lidar sensors utilized to cover an area surrounding an autonomous vehicle. The increased field of view of the lidar sensors improves system efficiency and operation of the autonomous vehicle, since the example systems and methods described herein enable data associated with areas previously out of view of lidar systems to be captured. Examples of such systems, vehicles, components, and methods will be described in further detail below with respect to FIGS. 1-7.

Figure 1:
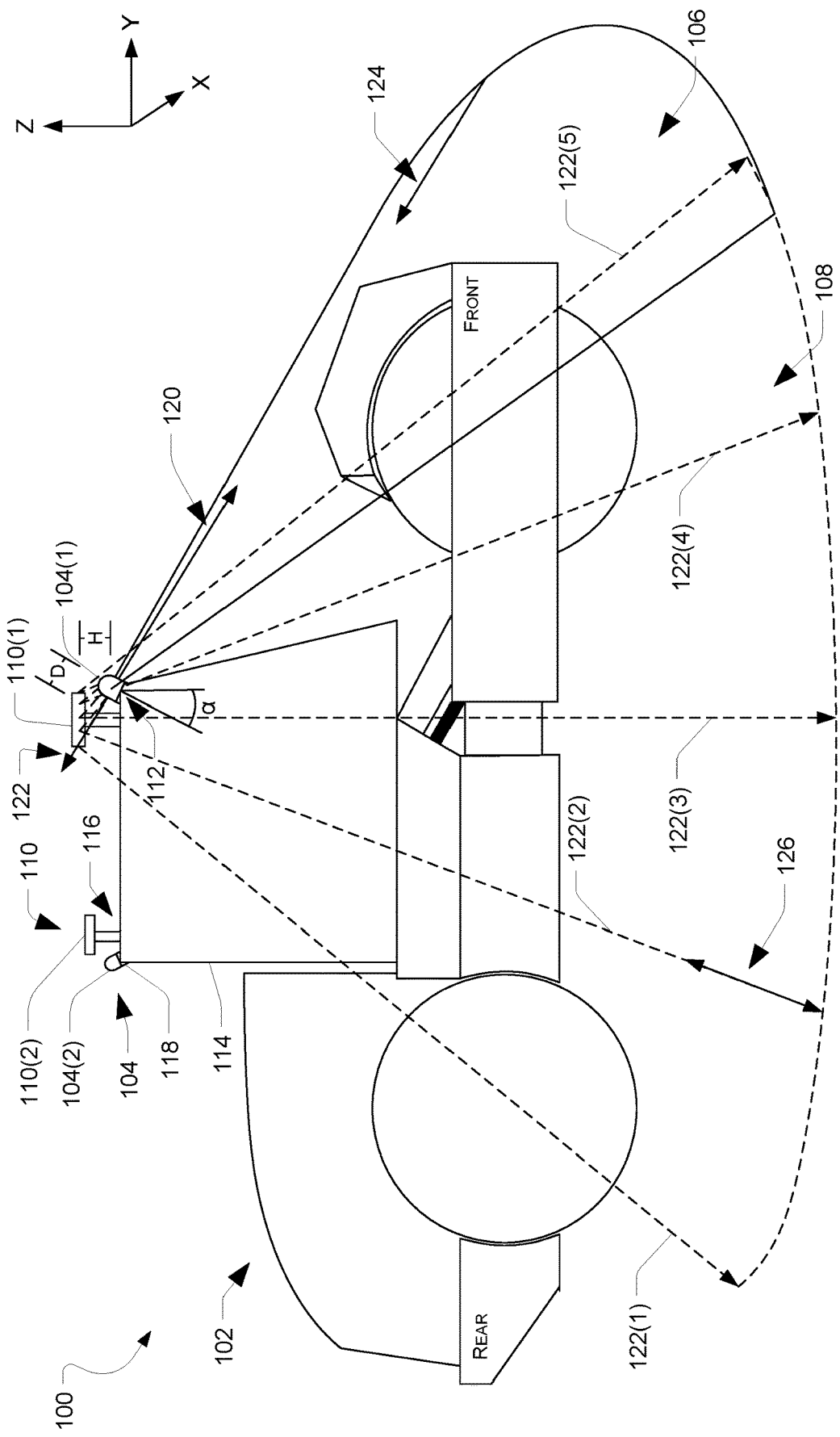
FIG. 1 is a side view of a vehicle including a lidar system (e.g., a sensor system) in accordance with an example embodiment of the present disclosure. The example system shown in FIG. 1 includes a lidar system with an increased field of view, the lidar system comprising a first lidar sensor, a second lidar sensor, and mirrors associated therewith. For simplicity in illustration, only lidar beams (e.g., light beams) emitted from the first lidar sensor and reflected off a first mirror are illustrated.

FIG. 1 shows an example lidar system 100 of the present disclosure associated with a vehicle 102. The vehicle 102 includes an autonomous vehicle, a semi-autonomous vehicle, or a manned vehicle. The lidar system 100 includes lidar sensors 104 configured to capture sensor data associated with one or more areas (e.g., a first area 106, a second area 108, etc.) proximate the vehicle 102. The lidar system 100 additionally includes one or more mirrors 110 associated with each lidar sensor 104.

In the illustrative example, a first lidar sensor 104(1) is coupled to the vehicle 102 proximate a first corner 112 of a body 114 of the vehicle 102 and a second lidar sensor 104(2) is coupled to the vehicle 102 proximate a second corner 116. In some examples, the first corner 112 and the second corner 116 include corners formed of a top and front surface of the body 114. In some examples, the first corner 112 and the second corner 116 include corners formed of a top, front, and side surface of the body 114. In some an example, the body 114 comprises a substantially rectangular shape and the first corner 112 may be opposite a second corner 116. In other examples, the body 114 comprises a substantially elliptical, cylindrical, or other shape. In such examples, the first lidar sensor 104(1) and the second lidar sensor 104(2) may be disposed on opposite sides of the body 114. As will be described in greater detail below with regard to FIG. 2, in some examples, the lidar sensors 104 are coupled to the vehicle 102 along a longitudinal (Y) axis of the vehicle 102.

A lidar sensor 104, such as the second lidar sensor 104(2), may be coupled to the vehicle 102 via a coupling 118. The coupling 118 may include an L-shaped coupling, a J-shaped coupling, a U-shaped coupling, a T-shaped coupling, a mounting plate, screws, bolts, nails, and/or any other type of coupling configured to securely couple the lidar sensor 104 to the vehicle 102. In some examples, the coupling 118 is additionally configured to securely couple a mirror 110, such as second mirror 110(2) to the vehicle 102. In such examples, the second lidar sensor 104(2) and the second mirror 110(2) are both coupled to the coupling 118, which is then coupled to the body 114 of the vehicle 102. In other examples, lidar sensors 104 and the mirrors 110 are coupled to the vehicle 102 via respective couplings 118.

In various examples, the coupling 118 couples a lidar sensor 104 at an angle ($\alpha$) from a vertical (Z) axis associated with the vehicle 102. The angle ($\alpha$) includes any angle between 5 and 85 degrees. In various examples, the angle ($\alpha$) is determined based at least in part on a shape and/or configuration of the vehicle 102. In various examples, the angle ($\alpha$) is determined based on a size of the first area 106 to be represented by data captured by the first lidar sensor 104(1). In such examples, the angle ($\alpha$) is based on a distance from the vehicle to be monitored by the first lidar sensor 104(1). For example, a sensor 104 may be oriented at a 15-degree angle ($\alpha$) to capture data 5 meters in front of the vehicle 102 and another lidar sensor 104(2) may be oriented at a 10-degree angle ($\alpha$) to capture data 7 meters behind the vehicle 102.

The lidar sensors 104 are configured to emit light beams (e.g., lidar beams, pulses of light, etc.) in a 360-degree cyclical pattern about a vertical (Z) axis of the lidar sensors 104. For example, the lidar sensors 104 emit a first light beam at 0 degrees, a second light beam at 1 degree, a third light beam at 2 degrees, and so on, throughout a 360-degree cycle of emission. As an illustrative example, the first lidar sensor 104(1) oriented at the angle ($\alpha$) emits first light beams 120 (shown as a single light beam for illustrative purposes, however, one skilled in the art understands that first light beams 120 include a plurality of light beams) toward the first area 106. In FIG. 1, the first area 106 includes an area substantially in front of the vehicle 102. This is an illustrative example, and the first area 106 may include an area behind and/or on a side of the vehicle 102.

As discussed above, an extent of the first area (e.g., distance from the vehicle 102) may be based in part on the angle ($\alpha$). In some examples, the size of the first area 106 is determined based on a speed associated with the vehicle (e.g., maximum speed, average operating speed, etc.), an environment in which the vehicle operates (e.g., construction area, on roadways, etc.), handling characteristics of the vehicle 102 (e.g., radius of turn, agility, stopping distances, etc.), and the like. For example, a vehicle 102, such as a compactor, configured with an operating speed of 10 kilometers per hour includes a first area 106 extending 3 meters in front of the vehicle 102. For another example, a compactor (vehicle 102) configured with an operating speed of 20 kilometers per hour includes a first area 106 extending 7 meters in front of the vehicle 102.

Additionally, the first lidar sensor 104(1) emits second light beams 122 away from the first area 106. Based on the angle ($\alpha$), the second light beams are emitted in a direction associated with the sky. In various examples, the first lidar sensor 104(1) has associated therewith a first mirror 110(1) configured to reflect at least a portion of the second light beams 122. In such examples, the first mirror 110(1) is configured to increase a field of view of the first lidar sensor 104(1). The first mirror 110(1) may include a rectangular shape, a circular shape, an elliptical shape, or any other shape mirror. In at least one example, the first mirror 110(1) includes a mirror with a spherical radius between 1600 and 2000 millimeters. Though larger and/or smaller spherical radii are contemplated herein.

In some examples, the first mirror 110(1) includes a concave mirror. In such an example, the first mirror 110(1) is configured to reflect sensor data toward a particular (e.g., small) area proximate the vehicle 102 (e.g., focus sensor data on the particular area). For example, the first mirror 110(1) is oriented to reflect second light beams 122 toward a region in front of a wheel of the vehicle 102, such as to maximize lidar data captured with respect to the region proximate the wheel. In at least one example, the first mirror 110(1) includes a convex mirror. In such an example, the first mirror 110(1) is configured to reflect second light beams toward an expanded area. In the illustrative example, the first mirror 110(1) includes a convex mirror configured to spread the portion of the second light beams 122 reflected onto the second area 108 encompassing the area proximate to and on the right side of the vehicle 102.

The first mirror 110(1) includes one or more mirrors 110 configured to reflect the second light beams 122 toward the second area 108 proximate the vehicle 102. In some examples, a number of mirrors 110 are determined based on a distance D between the first lidar sensor 104(1) and the associated first mirror 110(1) (e.g., 10 centimeters, 30 centimeters, 50 inches, etc.). For example, a system 100 with a distance D between 10 and 30 centimeters includes a single mirror 110. For another example, a system 100 with a distance D between 30 centimeters and 60 centimeters includes an array of four mirrors 110. Though these are merely examples, and any number of mirrors 110 in an array are contemplated herein.

In various examples, the first mirror 110(1) (or array of mirrors) is coupled to the vehicle 102, such as via a coupling 118, at a height H. In such examples, the height H is determined based in part on the angle (α). Thus, the mirror 110(1) is situated in a plane above that associated with the respective sensor 104 to enable the reflection of the second light beams 122 toward the second area 108. In the illustrative example, the first lidar sensor 104(1) and the second lidar sensor 104(2) are configured on a same (first) horizontal plane and the first mirror 110(1) and the second mirror 110(2) are configured on a same (second) horizontal plane. In other examples, the first lidar sensor 104(1) and/or the second lidar sensor 104(2) are configured on different planes with respect to one another and/or the first mirror 110(1) and the second mirror 110(2) are configured to different planes with respect to one another. As will be discussed in further detail below with regard to FIG. 6, the first mirror 110(1) are situated at a height H (on a plane above the first lidar sensor 104(1)) to reflect a portion of the second light beams 122 associated with an arc (e.g., set of angles associated with emissions) of the 360-degree emissions from the first lidar sensor 104(1). The arc may include any angle from 10 degrees to 180 degrees. Additionally, the first mirror 110(1) is situated at an orientation to reflect the second light beams 122 toward the second area 108. The orientation includes an angular orientation about a longitudinal and/or vertical axis of the first mirror 110(1).

In various examples, an array of mirrors 110 associated with a particular lidar sensor 104 (e.g., oriented to reflect second light beams 122 emitted therefrom) is coupled to the vehicle 102 proximate one another. In such examples, the array of mirrors 110 is configured to reflect consecutive second light beams 122 (e.g., light beams emitted in a single arc associated with sensor emissions). In some examples, an array of mirrors associated with a particular lidar sensor 104 are coupled to the vehicle a second distance from one another. In such examples, a first mirror or array of mirrors is configured to reflect second light beams 122 emitted in a first arc and a second mirror or array of mirrors are configured to reflect second light beams 122 emitted in a second arc. Such an example is illustrated and further explained below with regard to FIG. 2.

In various examples, the number (or portion) of second light beams 122 reflected by the first mirror 110(1) over the arc are determined based on the distance D (or range of distances, e.g., 10-100 centimeters, etc.), the size and/or shape of the first mirror 110(1), and/or the size and/or shape of the second area 108 to be captured. As depicted in FIG. 1, five light beams 122, illustrated as 122(1), 122(2), 122(3), 122(4), and 122(5), are reflected toward the second area 108, such as to capture data associated therewith. Though this is merely an illustrative example, and a greater or lesser number of light beams may be reflected toward the second area to capture sensor data associated therewith. Accordingly, a single lidar sensor 104(1) of the system 100 is configured to generate first sensor data associated with the first area 106 directly based on first light beams 120 and second sensor data associated with the second area 108 based on second light beams 122 reflected off the first mirror 110(1).

The first lidar sensor 104(1) receives one or more first lidar returns 124 associated with the first area 106. The first lidar return(s) 124 includes light beams reflected off a surface of the first area 106. In various examples, the first lidar return(s) 124 include light beams that are directly reflected off the surface. The surface includes a surface across which the vehicle travels (e.g., ground), a surface of an object (e.g., dynamic object (e.g., animal, another vehicle, machine, etc.), static object (e.g., berm, curb, side of a road, operating boundary, etc.), etc.), or the like.

The first lidar sensor 104(1) is configured to determine first sensor data associated with the first area 106. In various examples, the first sensor data is based on the speed of light and a time associated with the first lidar returns 124. In various examples, the first sensor data includes a set of data points generated based on a direct reflection of the first light beams 120 off a surface of the first area 106. The first sensor data includes a representation (e.g., two dimensional, three-dimensional, etc.) of the first area 106. The representation may include static and/or dynamic objects located at least in part in the first area. For example, the representation includes a portion of an operating boundary (e.g., static object) associated with operation of the vehicle 102.

Additionally, the first lidar sensor 104(1) is configured to determine second sensor data associated with the second area 108. The second sensor data includes a representation (e.g., two dimensional, three-dimensional, etc.) of the second area 108. The representation includes static and/or dynamic objects located at least in part in the second area 108. For example, the representation includes another machine (e.g., dynamic object) proximate the vehicle 102.

The first lidar sensor 104(1) receives one or more second lidar returns 126 associated with the second area 108. The second lidar returns 126 include second light beams 122 reflected off a surface of the second area 108, reflected off the first mirror 110(1), and received by the first lidar sensor 104(1). The first lidar sensor 104(1) is configured to determine second sensor data associated with the second area 108 based in part on the distance D between the first lidar sensor 104(1) and the first mirror 110(1), a distance between the first mirror 110(1) and the surface associated with the second area 108, and/or a distance between the first lidar sensor 104(1) and the second area 108. In such an example, the first lidar sensor 104(1) is configured to account for additional distance the second light beams travel to the second area 108.

As will be discussed in further detail below with regard to FIG. 6, the first lidar sensor 104(1) is configured to determine the second sensor data based on the arc associated with the portion of the second lidar beams 122 reflecting off the surface. In some examples, the arc is pre-programmed into the first lidar sensor 104(1). In such examples, the first lidar sensor 104(1) is programmed to modify second lidar returns 126 based on a determination that the second lidar returns 126 are associated with the arc. For example, the first lidar sensor 104(1) determines that emissions from 0 to 20 degrees are associated with the first mirror 110(1). Accordingly, the first lidar sensor 104(1) receives second lidar returns 126 between 0-20 degrees and may process the second lidar returns 126 based on the increased distance (e.g., distance D+distance between the first mirror 110(1) and the surface associated with the second area 108–distance between the first lidar sensor 104(1) and the second area 108). The first lidar sensor 104(1) then receives first lidar returns 124 outside of the arc (e.g., any other arc from 21 to 359 degrees) and may process the first lidar returns 124 based on the distance between the first lidar sensor 104(1) and the surface associated with the first area 106.

In some examples, the first lidar sensor 104(1) determines the arc during operation based on a second lidar return 126 indicating substantially the distance D. In some examples, the first lidar sensor 104(1) determines, based on the distance D, that a second light beam 122 is reflecting off a surface of the mirror (e.g., a border, a non-mirrored surface, etc.) directly back to the first lidar sensor 104(1). In some examples, the direct reflection from the mirror at substantially the distance D may indicate to the first lidar sensor 104(1) a beginning of the first mirror 110(1). In such examples, the first lidar sensor determines to process second lidar returns 126 based on the distance D, and the distance between the first mirror 110(1) and the surface associated with the second area 108.

The first lidar sensor 104(1) may provide the first sensor data associated with the first area 106 and the second sensor data associated with the second area 108 to a vehicle computing system. In various examples, the first lidar sensor 104(1) combines the first sensor data and the second sensor data into a single batch of sensor data prior to sending the sensor data to the vehicle computing system. In such examples, the sensor data represents the first area and the second area combined.

The vehicle computing system receives the first sensor data and/or the second sensor data from the first lidar sensor 104(1). Additionally, the vehicle computing system receives third sensor data and/or fourth sensor data from the second lidar sensor 104(2). The third sensor data and/or the fourth sensor data include representations associated with other areas proximate the vehicle 102. For example, the first area 106 represents an area in front of the vehicle 102, the second area 108 represents an area on a right side of the vehicle 102, a third area represents an area behind the vehicle 102, and a fourth area represents an area on a left side of the vehicle 102. The third sensor data and/or the fourth sensor data are generated by the second lidar sensor 104(2) utilizing similar techniques as those described above with regard to the first lidar sensor 104(1) (and a second mirror 110(2)).

In various examples, the vehicle computing system receives the first sensor data, the second sensor data, the third sensor data, and/or the fourth sensor data (collectively sensor data) and determines an action for the vehicle 102 to take. In some examples, the action may include determining a trajectory for the vehicle 102 to travel through an environment. For example, an autonomous vehicle operates in an environment with an operating boundary. The vehicle computing system receives the sensor data and determines a location (or locations) associated with the operating boundary. The vehicle computing system then determines one or more trajectories to control the vehicle within the confines of the operating boundary, such as, along the boundary itself.

In some examples, the vehicle computing device is configured to determine one or more dynamic objects operating in proximity to the vehicle 102. The dynamic objects include people, animals, another vehicle (e.g., other equipment), and the like. In various examples, the vehicle computing device are configured to classify the dynamic object. In such examples, the vehicle computing system determines whether a detected object is an animal, another vehicle (e.g., another machine), etc. In some examples, the trajectory of the vehicle is determined based at least in part on the dynamic objects and/or a classification thereof. For example, the vehicle computing system determines to slow down (or stop) based on the detection of the object proximate the vehicle 102.

In various examples, the vehicle computing system is configured to cause a warning signal to be emitted based on the detection of a dynamic object and/or a classification thereof. The warning signal includes an audio (e.g., warning sound) and/or visual (e.g., light, flashing light) signal configured to warn the dynamic object of the vehicle 102 operation.

Figure 2:
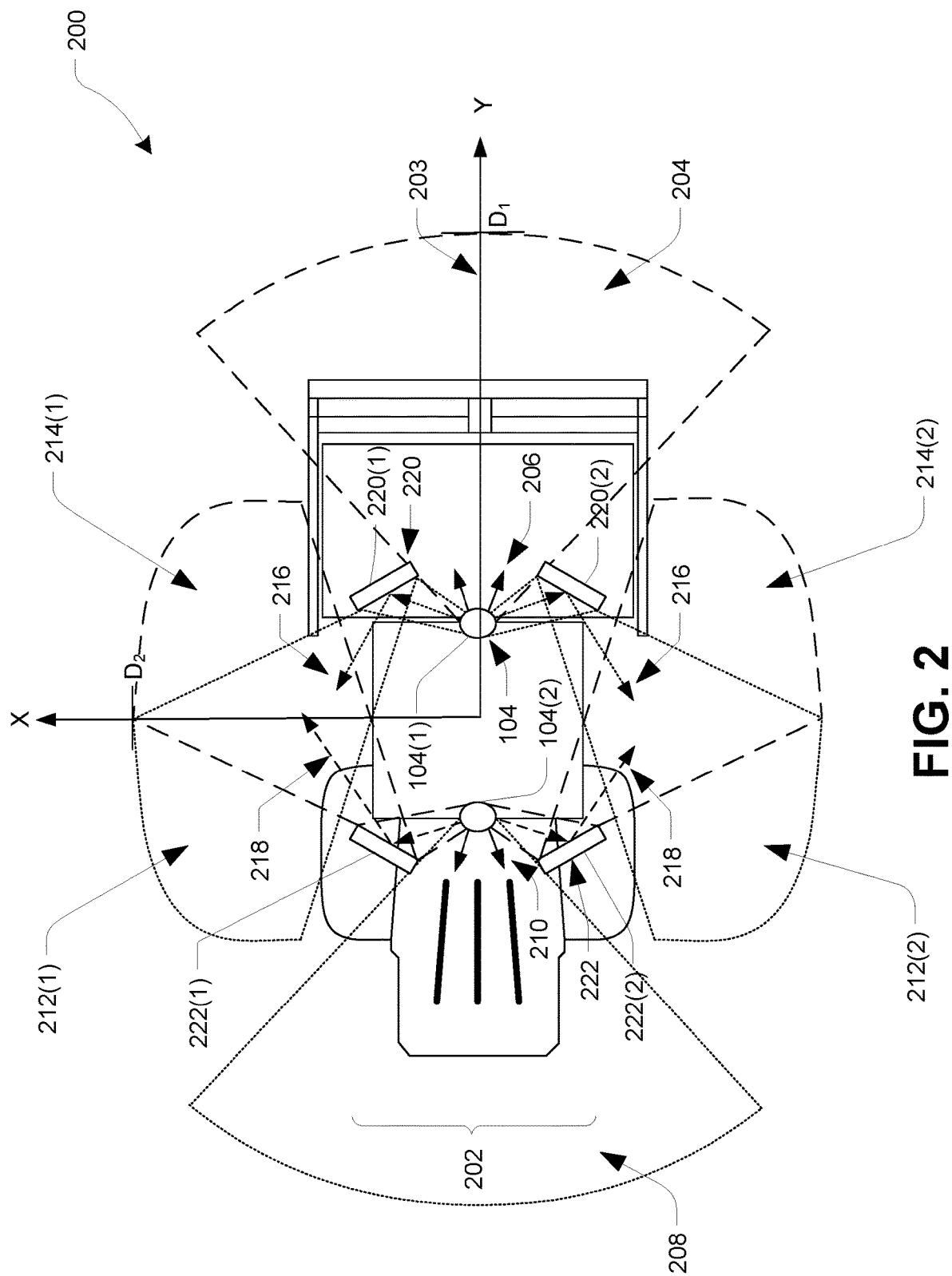
FIG. 2 is a top view of a vehicle including an example lidar system with lidar sensors mounted along a longitudinal axis of the vehicle, in accordance with examples of this disclosure.

FIG. 2 is a top view of a vehicle 200, such as vehicle 102 including an example lidar system 202, such as lidar system 100, with a first lidar sensor 104(1) and a second lidar sensor 104(2) mounted along a longitudinal (Y) axis 203 of the vehicle 200, in accordance with examples of this disclosure.

In the illustrative example of FIG. 2, the first lidar sensor 104(1) is oriented to determine sensor data associated with a front area 204 (e.g., area in front of the vehicle 200, first area, such as first area 106) based on first light beams 206 and the second lidar sensor 104(2) is oriented to determine sensor data associated with a rear area 208 (e.g., area behind the vehicle 200, second area, such as second area 208) based on second light beams 210. In some examples, the sensor data is generated responsive to the first light beams 206 and the second light beams 210 directly reflecting off a surface associated with the front area 204 and rear area 208, respectively. In such examples, the first lidar sensor 104(1) and/or the second lidar sensor 104(2) are oriented at an angle (e.g., α of FIG. 1). The angle associated with the first lidar sensor 104(1) may be the same or different from the angle associated with the second lidar sensor 104(2), such as based on the size and/or shape of the vehicle 200, the size and/or shape of the front area 204 and/or the rear area 208, a height associated with each of the first lidar sensor 104(1) and/or the second lidar sensor 104(2).

In the illustrative example, the front area 204 includes substantially the same size and/or shape as the rear area 208. In other examples, the front area 204 includes a different size and/or shape from the rear area 208. For example, a first lidar sensor 104(1) is configured at an angle to cover a front area 204 extending a first distance ($D_1$) of 10 meters in front of the vehicle 200 and a second lidar sensor 104(2) is configured at an angle to cover a rear area 208 spanning a first distance ($D_1$) of 5 meters behind the vehicle 200.

Additionally, the first lidar sensor 104(1) is configured to determine sensor data associated with one or more side areas 212, such as first side area 212(1) and second side area 212(2) and/or the second lidar sensor 104(2) is configured to determine sensor data associated with one or more side areas 214, such as first side area 214(1) and second side area 214(2). In various examples, the first lidar sensor 104(1) emits third light beams 216 in a different direction than that associated with the front area 204 and the second lidar sensor 104(2) emits fourth light beams 218 in a different direction than that associated with the rear area 208, such as based on the orientation (e.g., angle) of the respective lidar sensors 104(1) and 104(2).

In the illustrative example, lidar system 202 includes a first mirror array 220 associated with the first lidar sensor 104(1) and a second mirror array 222 associated with the second lidar sensor 104(2). In various examples, the first mirror array 220 is coupled to the vehicle at a height above the first lidar sensor 104(1), based on the orientation of the first lidar sensor 104(1). In such examples, the first mirror array is coupled to the vehicle at height sufficient to reflect third light beams 216. Additionally, the second mirror array 222 is coupled to the vehicle 200 at a height above the second lidar sensor 104(2), based on the orientation of the second lidar sensor 104(2), such as to reflect the fourth light beams 218.

As illustrated, the first mirror array 220 includes a first mirror 220(1) and a second mirror 220(2) and the second mirror array 222 includes a first mirror 222(1) and a second mirror 222(2). The mirrors 220(1), 220(2), 222(1), and 222(2) include mirrors of any shape, e.g., rectangular, circular, elliptical, or the like. In some examples, one or more of the mirrors 220(1), 220(2), 222(1), and 222(2) include a concave mirror. In some examples, one or more of the mirrors 220(1), 220(2), 222(1), and 222(2) include a convex mirror. In some examples, mirrors 220(1) and 220(2) associated with the first mirror array 220 include convex mirrors and the mirrors 222(1) and 222(2) associated with the second mirror array 222 include concave mirrors, or vice versa. For example, the mirrors 220(1) and 220(2) associated with the first mirror array 220 include convex mirrors configured to reflect third light beams 216 along a side of the vehicle 200, such as to detect objects operating proximate the side of the vehicle 200. The mirrors 220(1) and 220(2) associated with the second mirror array 220 include concave mirrors configured to reflect third light beams 216 toward a wheel of the vehicle 200. In such an example, the mirrors 220(1) and 220(2) are configured to third light beams 216 toward the wheel, such as to ensure the vehicle 200 does not roll over an unintended object.

In various examples, the first mirror 220(1) and the second mirror 220(2) associated with the first mirror array 220 and the first mirror 222(1) and the second mirror 222(2) associated with the second mirror array 222 are configured to reflect the third light beams 216 and fourth light beams 218, respectively, a second distance $D_2$ from the vehicle. In such an example, the respective lidar sensors 104(1) and 104(2) generate sensor data associated with the side areas 212 and 214 extending the second distance $D_2$ from the vehicle 200. In the illustrative example, the second distance $D_2$ is less than the first distance $D_1$. In such an example, a vehicle computing system monitors an area closer to the vehicle 200 than the front area 204 and/or the rear area 208. In other examples, the mirror arrays 220 and 222 are configured to reflect the third light beams 216 and the fourth light beams 218 the distance $D_1$.

As illustrated, the first mirror 220(1) is configured to reflect a first portion of the third light beams 216 toward the first side area 212(1) and the second mirror 220(2) may be configured to reflect a second portion of the third light beams 216 toward the second side area 212(2). The first mirror 220(1) and the second mirror 220(2) additionally reflect lidar returns associated with the first portion and the second portion of the third light beams 216, respectively. The lidar returns represent the third light beams 216 reflected off a surface of the first side area 212(1) and the second side area 212(2). In some examples, the lidar returns represent the third light beams 216 reflected off an object located in the first side area 212(1) and/or the second side area 212(2).

In various examples, the first lidar sensor 104(1) are configured to generate sensor data based on the third light beams 216. In such examples, the sensor data is based on a height of the first mirror 220(1) and/or the second mirror 220(2) above the first lidar sensor 104(1), a distance between the first lidar sensor and the first mirror 220(1), a distance between the first lidar sensor 104(1) and a first side area 212(1), a distance between the first lidar sensor 104(1) and the second mirror 220(2), and/or a distance between the first lidar sensor 104(1) and the second side area 212(2). In various examples, the first lidar sensor 104(1) is configured, such as via software, to account for additional distance the third light beam 216 travels to the respective side areas 212(1) and 212(2) and back (e.g., distance lidar returns travel back to the first lidar sensor 104(1) via respective mirrors 220(1) and 220(2)).

As discussed above, in some examples, the first lidar sensor 104(1) is pre-programmed based on a first arc associated with the first portion of the third light beams 216 and a second arc associated with the second portion of the third light beams 216. In some examples, the first lidar sensor 104(1) is configured to determine the portion of the third light beams 216 reflecting off a mirror 220(1) or 220(2) based on a determination that a light beam of the third light beams 216 has reflected off a non-mirrored surface of the mirror array 220, directly back to the first lidar sensor 104(1). For example, a first light beam of the third light beams 216 reflects off a first non-mirrored surface of a first mirror 220(1), denoting the beginning of the first mirror 220(1). The first lidar sensor 104(1) processes lidar returns associated with the third light beams 216 based on the mirror 220(1) (e.g., additional distances, etc.). A second light beam of the third light beams 216 reflects off a second non-mirrored surface of the first mirror 220(1), denoting the end of the first mirror 220(1). Accordingly, the first lidar sensor 104(1) processes subsequently received lidar returns as direct reflections off surfaces (e.g., based on the speed of light without accounting for additional distance traveled).

The second lidar sensor 104(2) is configured to generate sensor data representative of the rear area 208, such as based on the second light beams 210. Additionally, the second lidar sensor 104(2) is configured to generate sensor data representative of the first side area 214(1) and the second side area 214(2), such as based on the fourth light beams 218 reflecting off the second mirror array 222 (e.g., a first portion of the fourth light beams 218 reflecting off the first mirror 222(1) and a second portion of the fourth light beams 218 reflecting off the second mirror 222(2)). The second lidar sensor 104(2) is configured to generate the sensor data similar to the first lidar sensor 104(1) described above, such as by accounting for an additional distance traveled between the sensor 104(2), the mirrors 222(1) and 222(2), and the respective side areas 214(1) and 214(2).

In various examples, the first lidar sensor 104(1) and the second lidar sensor 104(2) send respective sensor data to the vehicle computing system. The vehicle computing system receives the sensor data associated with the front area 204, the rear area 208, and the side areas 212 and 214, and determines one or more objects associated with the areas. In some examples, the vehicle computing system is configured to classify the object(s) detected in the area(s). In such examples, the vehicle computing system includes a machine learned model trained to classify one or more objects based on a size, shape, movement, and the like associated with the object.

In some examples, the vehicle computing system controls the vehicle 200 based on the sensor data and/or the object(s). In some examples, the vehicle computing system determines one or more trajectories with which to control the vehicle 200. The one or more trajectories include one or more direction(s) of travel and/or speeds at which the vehicle 200 may travel through an environment. For example, the sensor data includes a representation of an operating boundary, such as a berm on which the vehicle 200 may not travel. The vehicle computing system determines a direction of travel associated with the trajectory to maintain the vehicle 200 within the operating boundary (e.g., off the berm). For another example, the vehicle computing system identifies an object (e.g., an animal, another machine, etc.) in front of the vehicle 200. The vehicle computing system determines a vehicle trajectory including a deceleration to a stop, such as to avoid a collision with the object.

In some examples, the vehicle computing system detects one or more objects located within the front area 204, the rear area 208, and/or the side areas 212 and 214 and emits a warning signal to alert the object(s) of vehicle 200 operation. The warning signal includes an audio and/or visual signal. In various examples, a volume, frequency, and/or brightness of the warning signal is determined based at least in part on the object and/or the classification thereof. In some examples, the volume, frequency, and/or brightness of the warning signal is determined based on a distance between the object and the vehicle. In such examples, the vehicle computing system determines to increase a volume, change a frequency, and/or increase a luminosity of a warning signal based on a determination that the object is getting closer to the vehicle 200. In some examples, the volume and/or frequency of an audio warning signal is determined based on a type of object detected. For example, a vehicle computing system classifies an object as an animal (e.g., dog) and emits a warning signal at a second frequency and volume detectable by the animal (e.g., detectable or not detectable by a human).

Figure 3:
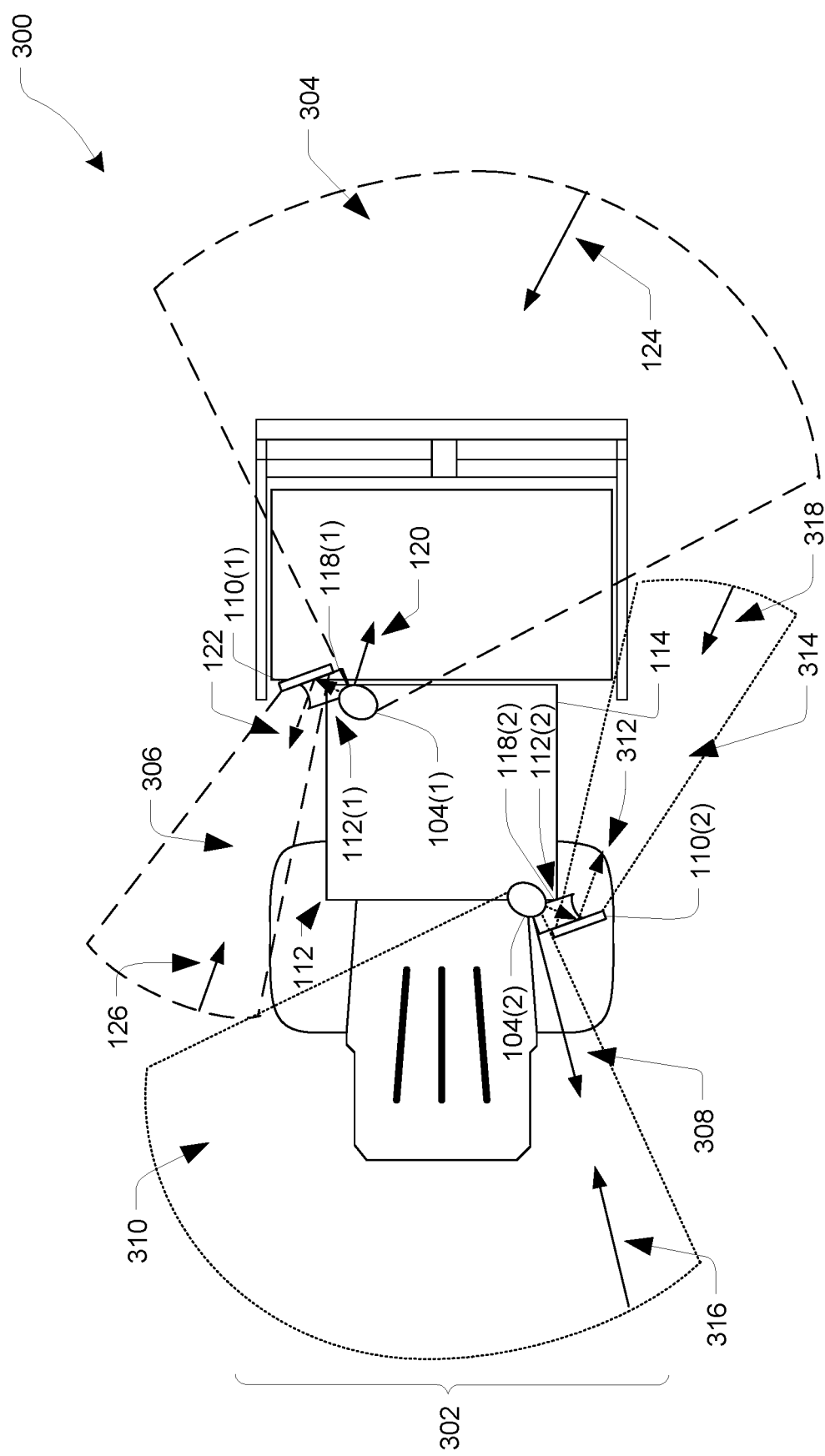
FIG. 3 is a top view of a vehicle including an example lidar system with corner mounted lidar sensors, in accordance with examples of this disclosure.

FIG. 3 is a top view of a vehicle 300 including an example lidar system 302, such as lidar system 100, with corner-mounted lidar sensors 104. The lidar system 302 includes a first lidar sensor 104(1) and a second lidar sensor 104(2). The lidar system 302 additionally includes a first mirror 110(1) associated with the first lidar sensor 104(1) and a second mirror 110(2) associated with the second lidar sensor 104(2). The first mirror 110(1) and the second mirror 110(2) are configured to reflect light beams emitted from respective lidar sensors 104(1) and 104(2), to increase the field of view of thereof. By increasing the field of view of the sensors 104(1) and 104(2), the mirrors 110(1) and 110(2) improves safe operation of the vehicle. Additionally, the increased field of view of the sensors 104(1) and 104(2) reduces a total number of lidar sensors 104 necessary to operate the vehicle 300, thereby reducing overall sensor system complexity.

In various examples, the first lidar sensor 104(1) and the second lidar sensor 104(2) are coupled to a component of the vehicle 300, such as a bumper, a mounting pole, or any other structure of the vehicle 300 configured to receive an exterior component. In such examples, the component of the vehicle 300 includes a component that is sufficiently strong, sturdy, and/or stable to house at least one of the first lidar sensor 104(1) or the second lidar sensor 104(2). In the illustrative example, the first lidar sensor 104(1) are coupled to a body 114 of the vehicle 300 in a first corner 112(1) and the second lidar sensor 104(2) are coupled to the body 114 in a second corner 112(2). In the illustrative example, the first corner 112(1) is opposite the second corner 112(2). In other examples, the first corner 112(1) and the second corner 112(2) are on a same side of the vehicle (e.g., front side, left side, right side, rear side).

The first lidar sensor 104(1) is coupled to the first corner 112(1) via a first coupling 118(1) and the second lidar sensor 104(2) is coupled to the second corner via a second coupling 118(1). In the illustrative example, the first coupling 118(1) and the second coupling 118(2) include J-shaped couplings in which the lidar sensors 104(1) and 104(2) may be coupled proximate a first end of the couplings 118(1) and 118(2) and the mirrors 110(1) and the 110(2) are coupled proximate a second end of the couplings 118(1) and 118(2). In such an example, the second end of the couplings 118(1) and 118(2) are elevated above the first end. In other examples, the first coupling 118(1) and the second coupling 118(2) include other shaped couplings, such as T-shaped couplings, L-shaped couplings, U-shaped couplings, plates, or any other couplings configured to couple at least one of a lidar sensor 104 or a mirror 110 to the vehicle 300.

As discussed above, the first lidar sensor 104(1) is oriented (e.g., tilted) at an angle, such as angle ($\alpha$), to emit a first set of light beams 120 toward a first area 304, such as first area 106. As shown in FIG. 1, the first area 304 includes an area in front of the vehicle 300. In other examples, the first area 304 includes an area behind or on a side of the vehicle 300. Based in part on the angled orientation of the first lidar sensor 104(1), the second light beams 122 may be directed in a direction associated with the sky (e.g., skywards, away from the ground, etc.). In various examples, the mirror 110(1) is coupled to the second end of the first coupling 118(1) at a first height (height H illustrated in FIG. 1) sufficient to reflect at least a portion of the second light beams 122.

Additionally, the second lidar sensor 104(2) is oriented at an angle to emit third light beams 308 toward a third area 310. The angle of orientation of the second lidar sensor 104(2) may be the same or a different angle as that associated with the first lidar sensor 104(1). In various examples, the second mirror 110(2) is coupled to a second end of the second coupling 118(2) at a second height sufficient to reflect at least a portion of fourth light beams 312 toward a fourth area 314 proximate the vehicle 300. As will be understood by one skilled in the art, the first mirror 110(1) and the second mirror 110(2) are elevated above the first lidar sensor 104(1) and 104(2), respectively, and are tilted at respective angles, such as to reflect the portion of the second light beams 122 toward the second area 306 and the portion of the fourth light beams 312 toward the fourth area 314, respectively.

As discussed above, the first lidar sensor 104(1) are configured to generate first sensor data based on first lidar returns 124 associated with the first light beams 120, and second lidar returns 126 associated with the second light beams 122. The second lidar sensor 104(2) is configured to generate second sensor data based on third lidar returns 316 associated with the third light beams 308 and fourth lidar returns 318 associated with the portion of the fourth light beams 312 reflected off the second mirror 110(2). The first lidar sensor 104(1) and the second lidar sensor 104(2) are configured to account for additional distance the portion of the second light beams 122, the second lidar returns 126, the portion of the fourth light beams 312, and the fourth lidar returns 318 travel based on reflection off the respective first mirror 110(1) and second mirror 110(2) (e.g., indirect route to the second area 306 and the fourth area 314, respectively).

The first lidar sensor 104(1) and the second lidar sensor 104(2) send the first sensor data and the second sensor data to a vehicle computing system associated with the vehicle 300. The vehicle computing system receives the first sensor data and the second sensor data and controls the vehicle based in part on the received data. In various examples, the vehicle computing system is configured to determine one or more objects located in at least one of the first area, the second area, the third area or the fourth area proximate the vehicle 300. The objects include static or dynamic objects. The static objects include one or more immovable objects around which the vehicle computing system may control the vehicle 300. For example, the static objects include operating boundaries, telephone poles, berms, large rocks, and/or any other non-moving obstacle over which the vehicle 300 may not travel. The dynamic objects include objects capable of movement, whether or not they are moving when detected, such as animals, other vehicles, and the like. In various examples, the vehicle computing system is configured to determine a classification associated with the objects and may determine an action to take based on the classification. For example, the vehicle computing system determines to yield to another vehicle located proximate the vehicle. For another example, the vehicle computing system determines to control the vehicle up to and along an operating boundary.

Figure 4:
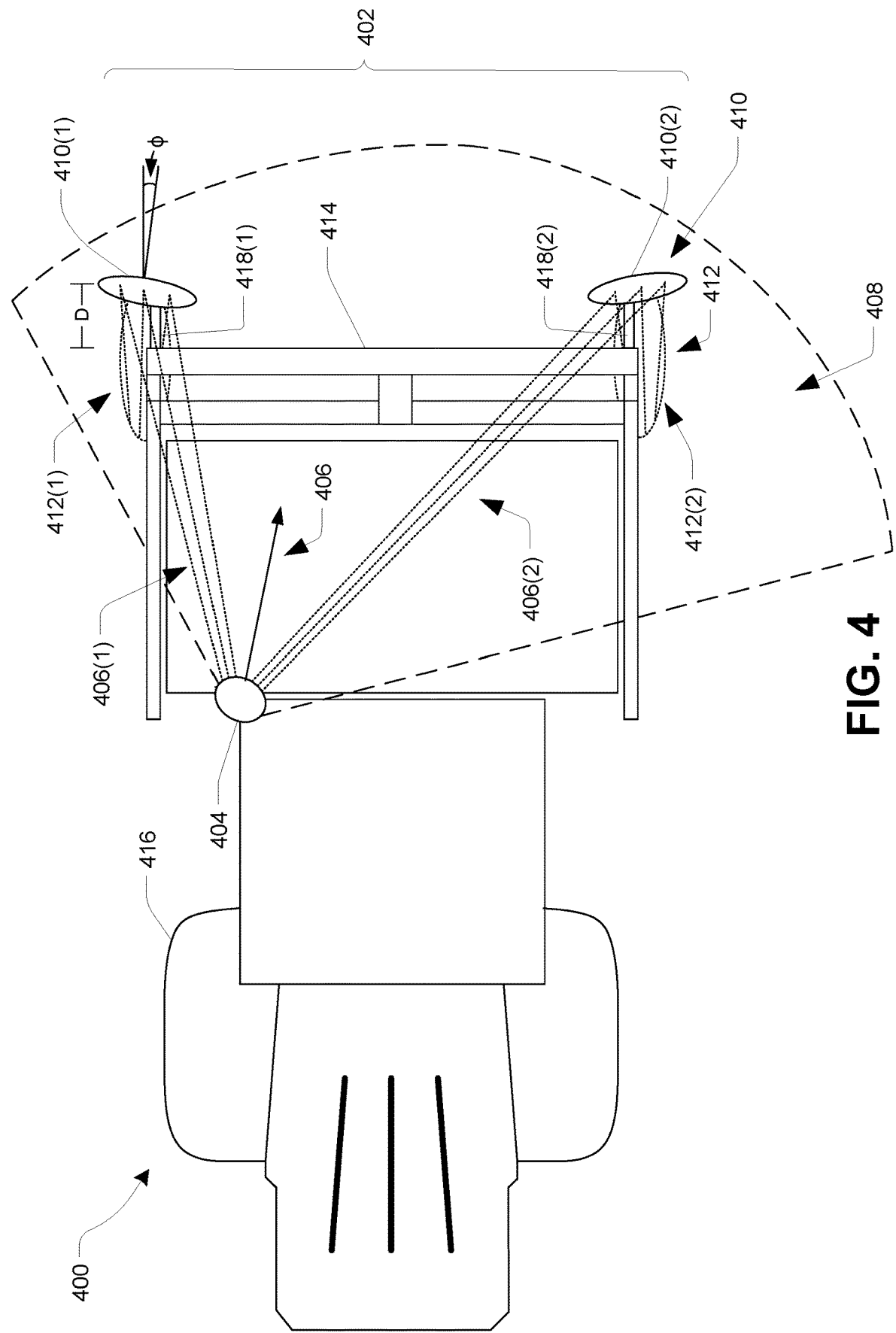
FIG. 4 is a top view of a vehicle including an example lidar system with an increased field of view to include an area blocked by a portion of the vehicle, in accordance with examples of this disclosure.

FIG. 4 is a top view of a vehicle 400 including an example lidar system 402 with an increased field of view to include an area blocked by a portion of the vehicle, in accordance with examples of this disclosure. Although illustrated as a lidar system 402 including a single lidar sensor 404, such as first lidar sensor 104(1), this is merely for illustrative purposes and is not intended to be so limiting. For example, the lidar system 402 may include one or more other lidar sensors 404, such as second lidar sensor 104(2). Additionally, the lidar system 402 may include one or more mirrors, such as mirrors 110, 220, and 222, configured to reflect light beams toward areas on a right and/or left side of the vehicle 400, such as described above.

As discussed above, the lidar sensor 404 emits light beams in a 360-degree horizontal plane relative to the lidar sensor 404. For example, the lidar sensor 404 emits a first light beam at 0 degrees, a second light beam at 1 degree, a third light beam at 2 degrees, and so on, in a 360-degree emission pattern. As illustrated in FIG. 4, the lidar sensor 404 is coupled to the vehicle 400 at an angle such that light beams 406 are directed toward a first area 408.

In various examples, the lidar sensor 404 includes one or more mirrors 410, such as a first mirror 410(1) and a second mirror 410(2). In some examples, the mirrors 410(1) and 410(2) include a rectangular shape, a circular shape, an elliptical shape, or any other shape mirror. In some examples, the mirrors 410(1) and 410(2) include concave mirrors. In such examples, the mirrors 410(1) and 410(2) are configured to reflect light beams 406 toward a particular location and/or a small area (e.g., area 412(1), 412(2), etc.). In some examples, the mirrors 410(1) and 410(2) include convex mirrors. In such examples, the mirrors 410(1) and 410(2) are configured to reflect light beams 406 toward a larger area.

In some examples, the areas 412 represent areas that are blocked from view of the first lidar sensor, such as due to a component of the vehicle 400. In the illustrative example, the areas 412 include areas underneath and blocked by a bumper 414 of the vehicle. In such an example, the lidar system 402 is configured to monitor areas proximate the vehicle 400 that are otherwise out of view thereof. By increasing the field off view of the lidar sensor 404 in critical areas, the lidar system 402 increases safe operation of the vehicle 400. In some examples, the areas 412 include areas proximate one or more tires 416 of the vehicle. In such examples, the lidar system 402 is configured to increase safe operation of the vehicle 400, such as to ensure that unintended objects do not get trapped by the tires of the vehicle 400 during operation.

In various examples, the first mirror 410(1) and the second mirror 410(2) are coupled to the vehicle 400 via respective couplings 418(1) and 418(2). In some examples, the couplings 418(1) and 418(2) extend the mirrors 410(1) and 410(2) a distance (D) from the vehicle 400, such as to reflect a first portion of the light beams 406(1) toward the first area 412(1) and/or a second portion of the light beams 406(2) toward the second area 412(2). In various examples, the couplings 418(1) and 418(2) include a fixed arm, set at the distance (D). In such examples, the distance (D) may be determined based on a size of the areas 412(1) and 412(2) to be monitored by the lidar sensor 404 and/or a size of the mirrors 410(1) and 410(2). In some examples, the couplings 418(1) and 418(2) include an adjustable arm, configured to extend and retract. In such examples, the couplings 418(1) and 418(2) may be extended and/or retracted based on the size of the vehicle 400, the location of the mirrors 410(1) and 410(2), a size of the areas 412(1) and 412(2) to be monitored, and the like.

In various examples, the first mirror 410(1) and the second mirror 410(2) are coupled to the couplings 418(1) and 418(2) at an angle ($\phi$). The angle ($\phi$) may be determined based on a location of the mirrors 410(1) and 410(2) respective to the areas 412(1) and 412(2), the size of the areas 412(1) and 412(2), a shape of the mirrors 410(1) and 410(2) (e.g., convex, concave, etc.), a size of the mirrors 410(1) and 410(2), and the like.

As discussed above, the mirrors 410(1) and 410(2) are configured to reflect the first portion and the second portion of the light beams 406(1) and 406(2) toward the respective areas 412(1) and 412(2). The portions of the light beams 406(1) and 406(2) reflect off a surface of the respective areas 412(1) and 412(2) and return to the mirrors 410(1) and 410(2). The mirrors 410(1) and 410(2) then reflect the lidar returns (e.g., light beams 406(1) and 406(2) reflected off the surface of the areas 412(1) and 412(2)) back toward the lidar sensor 404. The lidar sensor 404 is configured to generate sensor data associated with the areas 412(1) and 412(2) based on the lidar returns. In various examples, the lidar sensor 404 is configured to account for the additional distance the light beams 406(1) and 406(2) travel to the surface of the areas 412(1) and 412(2) due to reflection off the mirrors 410(1) and 410(2). In such examples, the lidar sensor is calibrated based on the additional distance. In some examples, the lidar sensor 404 determines the sensor data associated with the first area 408 based on a first set of equations associated direct reflections of light beams 406 off a surface associated therewith. In such examples, a computing system associate with the lidar sensor 404 applies the first set of equations to the light beams 406 directly reflecting off the surface of the first area 408. In some examples, the lidar sensor 404 determines the sensor data associated with the areas 412(1) and 412(2) based on a second set of equations associated with indirect reflections of the light beams 406(1) and 406(2). In such examples, the computing system associated with the lidar sensor 404 determines the sensor data associated with the areas 412(1) and 412(2) by applying the second set of equations to the indirect reflections of the light beams 406(1) and 406(2). The indirect reflections include interactions (e.g., contact) with the mirrors 410(1) and 410(2).

In some examples, the lidar sensor 404 accounts for the additional distance based on a pre-determined angle of light beam 406 emissions. In such examples, the lidar sensor 404 generates sensor data based on the second set of equations based on an angle of light beam emission associated with the first portion of the light beams 406(1) and an angle of light beam emission associated with the second portion of the light beams 406(2). In some examples, the lidar sensor 404 determines when to utilize the second set of equations based in part on receiving a first lidar return associated with a frame of the mirror 410(1) and/or 410(2) (e.g., first end of the mirror). In such examples, the lidar sensor 404 receives the lidar return at a distance associated with the mirror 410(1) or 410(2) and determines, based on the lidar return, to generate sensor data based on the second set of equations. Responsive to receiving a second lidar return associated with the frame of the mirror 410(1) and/or 410(2) (e.g., second end of the mirror), the lidar sensor 404 generates sensor data based on the first set of equations on subsequent lidar returns in the cycle.

In various examples, the lidar sensor 404 sends the sensor data to a vehicle computing system associated with the vehicle 400. As discussed above, the vehicle computing system controls the vehicle 400 based in part on the sensor data. In some examples, the vehicle computing system is configured to detect one or more objects associated with the area 412(1) and 412(2). In such examples, the vehicle is controlled based in part on the object(s). In some examples, the vehicle computing system is configured to classify the object(s). In some examples, the vehicle computing system emits a warning signal based on the objects, such as that described above and below.

Figure 5:
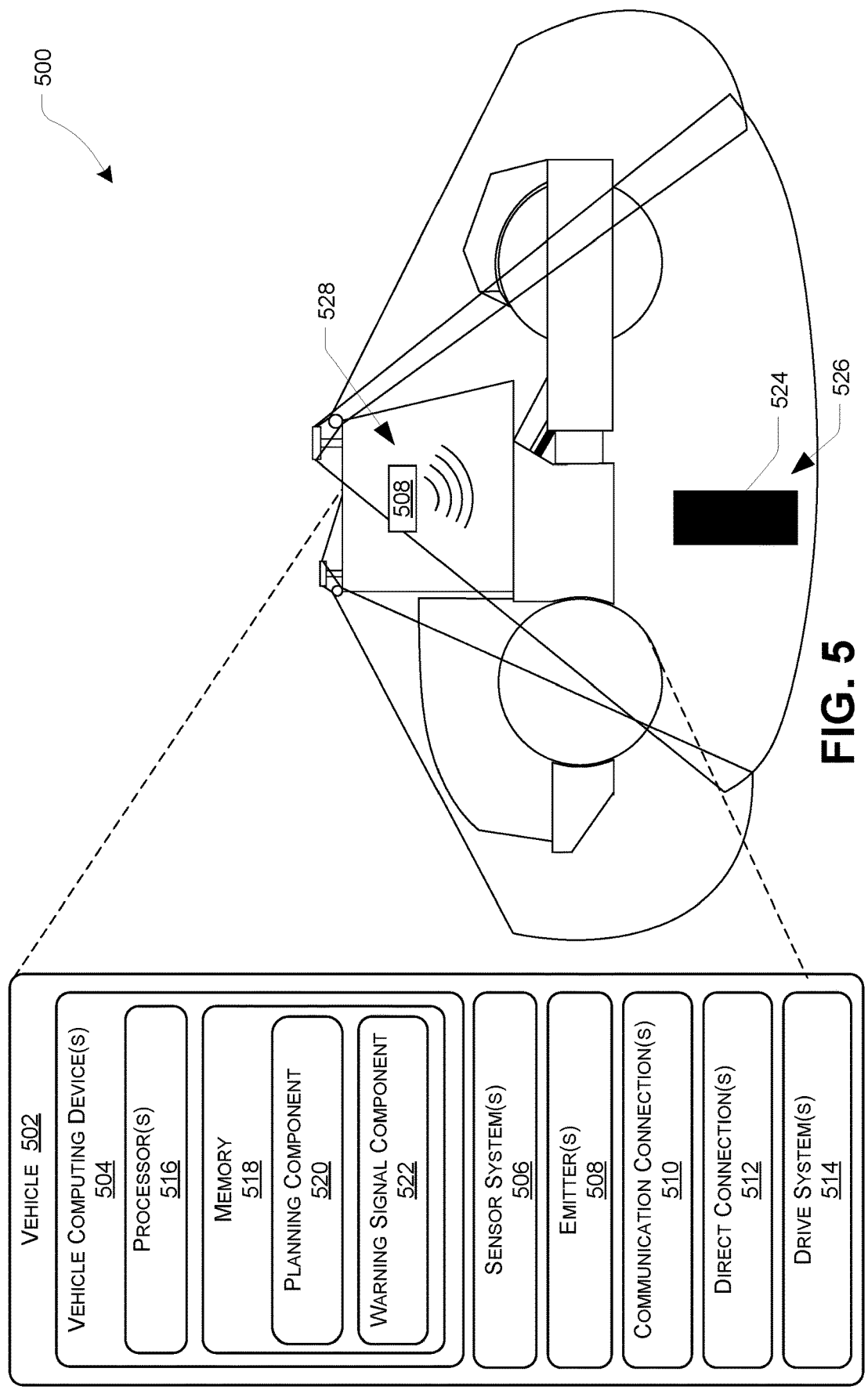
FIG. 5 is an illustration of an example system for implementing the techniques described herein.

FIG. 5 is an illustration of an example system 500 for implementing the techniques described herein. The vehicle 502, such as vehicle 102, 200, 300, and 400, includes one or more vehicle computing devices 504 (also referred to as a vehicle computing device 504 or vehicle computing device(s) 504), such as vehicle computing system described herein, one or more sensor systems 506, one or more emitters 508, one or more communication connections 510, a direct connection 512, and one or more drive systems 514.

The vehicle computing device 504 includes one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a planning component 520 and a warning signal component 522. Though depicted in FIG. 5 as residing in memory 518 for illustrative purposes, it is contemplated that the planning component 520 and the warning signal component 522 may additionally, or alternatively, be accessible to the vehicle 502 (e.g., stored remotely).

In at least one example, the vehicle computing device 504 includes the planning component 520. In some examples, the planning component 520 may be configured to receive sensor data from the sensor system(s) 506. In at least one example, the sensor data includes lidar data associated with one or more areas proximate the vehicle 502. Based in part on the sensor data, the planning component 520 is configured to determine a position and/or orientation of the vehicle 502 (e.g., one or more of an x-, y-, z-position, roll, pitch, or yaw). In some examples, the planning component 520 is configured to determine a location of the vehicle 502.

In some examples, the planning component 520 determines the location based in part on one or more maps associated with an environment in which the vehicle 502 operates. In such examples, the memory 518 stores the map(s), which may be used by the vehicle 502 to navigate within an environment. In some examples, the map(s) include any number of data structures modeled in two dimensions, three dimensions, or N-dimensions that are configured to provide information about the environment. In various examples, the planning component 520 utilizes the map(s) for vehicle 502 localization and control planning.

In some examples, a determined location of the vehicle 502 includes an initial location associated with a trajectory associated with vehicle 502 operation. In such examples, the planning component 520 determines one or more trajectories by which the vehicle computing device 504 controls the vehicle based on the initial location. In various examples, the one or more trajectories are determined based on one or more objects 524 detected proximate the vehicle. In the illustrative example, the object(s) 524 includes a post protruding out of a ground surface at a worksite associated with the vehicle 502. In other examples, the object(s) 524 may include any other static or dynamic object proximate the vehicle 502 in the worksite. In various examples, the planning component 520 determines the object(s) 524 based on the sensor data received from the sensor system(s) 506. In various examples, the planning component 520 determines one or more locations 526 associated with the object(s) 524. In such examples, the location(s) 526 are determined based on the sensor data. In the illustrated example, an object 524 is located on a right side of the vehicle 502. In such an example, the object 524 is determined (e.g., detected) based on light beams and lidar returns reflected off a mirror associated with a lidar sensor of the sensor system(s) 506.

In various examples, the planning component 520 is configured to determine a classification associated with the object(s) 524. The classification may include a an animal, building, a tree, road surface, curb, a berm, etc.). In some examples, the planning component 520 is configured to determine one or more characteristics associated with the object(s) 524. The characteristics may include a position and/or orientation, velocity, acceleration, a direction of travel, and the like. In some examples, the planning component 520 determines the vehicle 502 trajectory based on the objects 524.

In some examples, the memory 518 includes the warning signal component 522 configured to emit a warning signal toward the object(s) 524. In some examples, the warning signal component 522 receives an indication that the object(s) 524 are proximate the vehicle 502. In some examples, the warning signal component 522 determines that the object 524 may cause a conflict with the vehicle 502. In such examples, the conflict includes a disruption to the operation of the vehicle 502. For example, the vehicle computing device 504 determines that an object 524 is located in front of the vehicle 502 (e.g., in a path of the vehicle 502). The vehicle computing device 504 determines that, absent movement of the object 524 out of the path, the vehicle 502 will stop operation (e.g., yield to the object 524) to avoid a collision therewith and ensure safe operation. In some examples the determination of a conflict may be based on a location, position and/or orientation, movement (e.g., direction of travel, velocity, acceleration, etc.), and the like.

In some examples, based on a determination that the object 524 may cause a conflict with the vehicle 502, the warning signal component 522 determines to emit a warning signal 528 via the emitter(s) 508. In various examples, the warning signal includes an audio signal. In some examples, a frequency and/or volume of the warning signal 528 is determined based on the object 524, a classification and/or characteristic thereof. For example, the warning signal component 522 determines, at a first time, the object is 5 meters from the vehicle 502. The warning signal component 522 emits a first warning signal 528 at a first volume. The warning signal component determines, at a second time, that the object is 3 meters from the vehicle 502. The warning signal component emits a second warning signal 528 at a second volume, the second volume being higher than the first volume. For another example, the warning signal component 522 determines that a detected object 524 is a dog. The warning signal component 522 emits a warning signal 528 at a frequency detectable by dogs.

In some examples, the warning signal 528 includes a light signal. The warning signal 528 includes a light of any color and/or combination of colors, such as red, white, yellow, etc. In various examples, the warning signal 528 includes a flashing light. In some examples, the lights may change color, intensity (e.g., brightness), and/or frequency of flashes of the warning signal 528 are determined based on a distance between the object 524 and the vehicle 502 and/or a closure rate associated with the object 524 (e.g., how fact the object 524 is approaching the vehicle 502).

In some examples, the warning signal 528 is emitted directly at the object 524. In such examples, the warning signal component 522 may cause the warning signal 528 to be emitted via an emitter substantially facing the object 524 (e.g., within 30 degrees, 45 degrees, etc. of a direction associated with the object 524). In some examples, the warning signal 528 is emitted around the vehicle 502, such as to maximize effectiveness of the warning signal 528. For example, the warning signal component 522 detects an object proximate the vehicle 502. The warning signal component 522 emits a warning signal 528 around the vehicle to alert the others on the worksite or remote office of the vehicle 502 operation.

In some examples, the vehicle computing device(s) 504 may cause the warning signal 528 to additionally or alternatively be emitted and/or presented on a computing device remote from the vehicle 502 (e.g., a remote computing device). The remote computing device may include a computing device associated with a remote operation station and/or a remote operator of the vehicle 502, a worksite manager, and/or any other person or group of people generally tasked with monitoring the operation of the vehicle 502 in an environment, such as a worksite.

As discussed above, the vehicle computing device(s) 504 detects object(s) 524 and/or control the vehicle based on sensor data received from sensor system(s) 506. In at least one example, the sensor system(s) 506 include lidar sensors, such as lidar sensors 104 and 404. Additionally, the sensor system(s) 506 include one or more mirrors, such as mirrors 110, 220, 222, and/or 410, associated with one or more lidar sensors. In some examples, the sensor system(s) 506 include other types of sensors, such as radar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), environment sensors (e.g., temperature sensors, humidity sensors, light sensors, pressure sensors, etc.), and the like.

The sensor system(s) 506 include multiple instances of each of these or other types of sensors. For instance, the lidar sensors may include individual lidar sensors located at the corners, front, back, sides, and/or top of the vehicle 502. The sensor system(s) 506 provide input to the vehicle computing device 504. Additionally, or alternatively, the sensor system(s) 506 send sensor data to the one or more remote computing device(s) at a particular frequency, after a lapse of a predetermined period of time, in near real-time, etc.

The vehicle 502 also includes one or more emitters 508 for emitting light and/or sound, as described above. The emitters 508 in this example include exterior emitters. By way of example and not limitation, the exterior emitters in this example include lights to signal a warning of vehicle 502 operation and one or more audio emitters (e.g., speakers, speaker arrays, horns, etc.) to audibly provide the warning of vehicle 502 operation.

The vehicle 502 also include one or more communication connection(s) 510 that enable communication between the vehicle 502 and one or more other local or remote computing device(s). For example, the communication connection(s) 510 facilitates communication with other local computing device(s) on the vehicle 502 and/or the drive system(s) 514. Also, the communication connection(s) 510 allow the vehicle to communicate with other nearby computing device(s) (e.g., other nearby vehicles, etc.). The communications connection(s) 510 also enable the vehicle 502 to communicate with a remote computing device, such as for remote control of the vehicle 502.

The communications connection(s) 510 include physical and/or logical interfaces for connecting the vehicle computing device 504 to another computing device or a network. For example, the communications connection(s) 510 enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 includes one or more drive systems 514. The drive system(s) 514 include many of the vehicle systems, including a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting to illuminate an exterior surrounding of the vehicle), and one or more other systems. Additionally, the drive system(s) 514 include a drive system controller which may receive and preprocess data from the sensor system(s) 506 and to control operation of the various vehicle systems. In some examples, the drive system controller includes one or more processors and memory communicatively coupled with the one or more processors. The memory may store one or more components to perform various functionalities of the drive system(s) 514. Furthermore, the drive system(s) 514 also include one or more communication connection(s) that enable communication by the respective drive system with one or more other local or remote computing device(s).

In some examples, the direct connection 512 provides a physical interface to couple the one or more drive system(s) 514 with the body of the vehicle 502. For example, the direct connection 512 allows the transfer of energy, fluids, air, data, etc. between the drive system(s) 514 and the vehicle 502.

The processor(s) 516 of the vehicle 502 may be any suitable processor capable of executing instructions to process data and perform operations as described herein. By way of example and not limitation, the processor(s) 516 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 is an example of non-transitory computer-readable media. The memory 518 stores an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 includes at least a working memory and a storage memory. For example, the working memory may be a high-speed memory of limited capacity (e.g., cache memory) that is used for storing data to be operated on by the processor(s) 516. In some instances, the memory 518 includes a storage memory that may be a lower-speed memory of relatively large capacity that is used for long-term storage of data. In some cases, the processor(s) 516 may not operate directly on data that is stored in the storage memory, and data may need to be loaded into a working memory for performing operations based on the data, as discussed herein.

Figure 6:
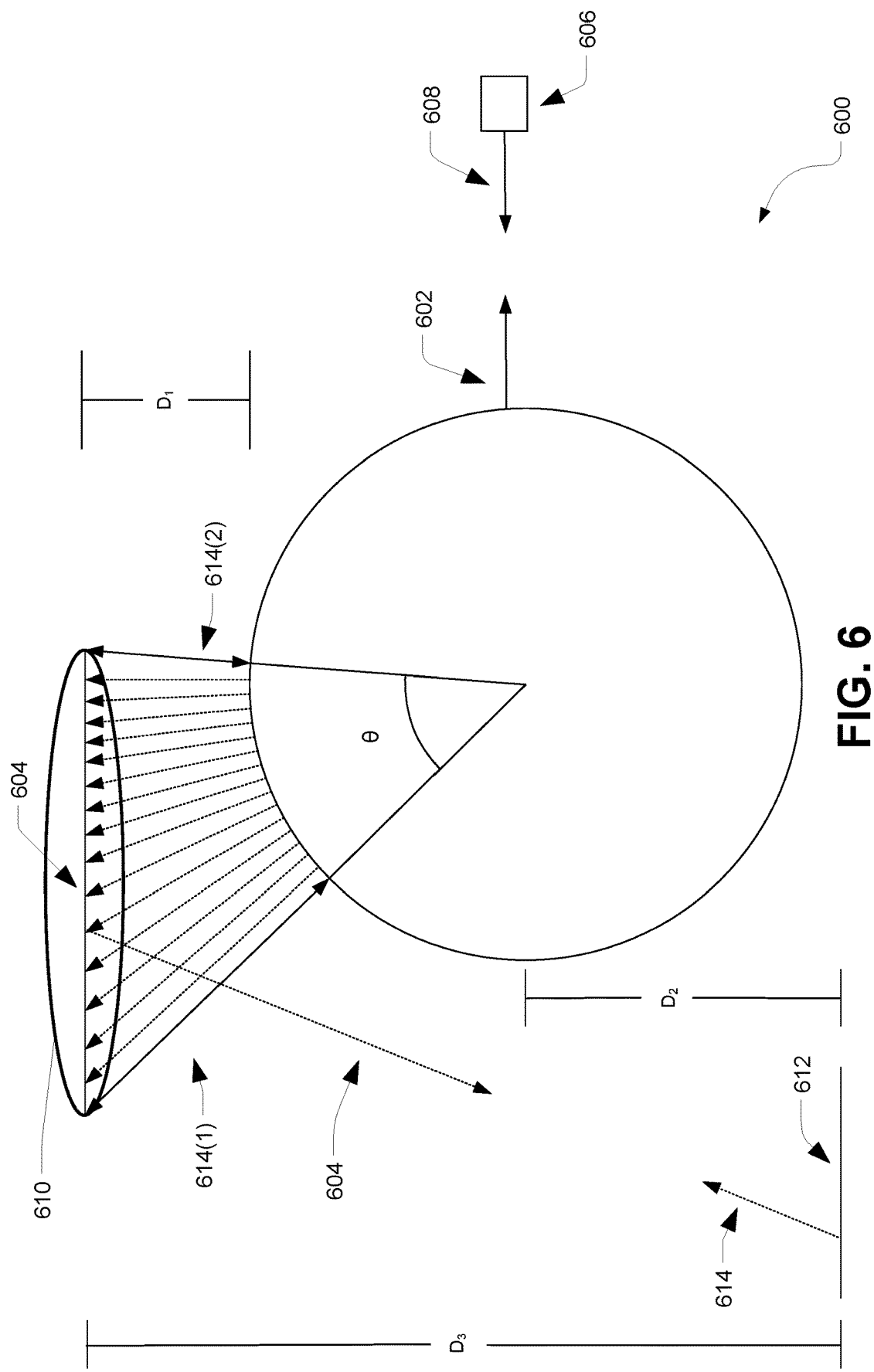
FIG. 6 is an example illustration of identifying light beams reflecting off a mirror for lidar sensor calibration, in accordance with examples of this disclosure.

FIG. 6 is an example illustration of a lidar sensor 600 (sensor 600) calibrated to generate first sensor data associated with first light beams 602 reflecting directly off a surface associated with a first area proximate a vehicle, such as vehicle 102, 200, 300, 400, and 502, and second sensor data associated with second light beams 604 reflected indirectly off a surface associated with a second area proximate the vehicle.

As discussed above, the lidar sensor 600 is oriented at an angle (e.g., angle (α) illustrated in FIG. 1) such that the first light beams 602 are emitted toward a first area, such as first area 106. The first light beams 602 directly reflect off a surface associated with the first area, such as off an object 606 located in the first area and may return to the sensor 600 as first lidar returns 608. In some examples, the sensor 600 is configured to determine the first sensor data (e.g., first lidar data) based on the direct reflection off the surface of the object 606. In some examples, the sensor 600 (a computing system thereof) applies the first lidar returns 608 to one or more first equations to determine locations and/or movement associated with the object 606 relative to the sensor 600. In some examples, the first equation(s) are determined based on the speed of light and one or more distances between the sensor 600 and a surface associated with the first area (e.g., a ground surface). In some examples, the first equation(s) are determined based on the speed of light, the angle of orientation of the sensor 600, and/or other factors associated with the sensor 600. The first sensor data includes point clouds including depths (e.g., depth information) associated with the object 606 and/or a surface associated with the first area.

In various examples, the lidar sensor 600 is configured to determine second sensor data (e.g., second lidar data) associated with the second light beams 604 reflected indirectly off a surface 612 associated with the second area. In the illustrative example, the surface 612 associated with the second area represents a ground surface proximate the vehicle. Though any other surface is contemplated, such as a surface associated with a second object, a berm, or the like.

As discussed above, the second area includes an area on a side of the vehicle, an area shielded from view of the first light beams 602 (e.g., underneath a bumper or other vehicle component), or other area out of view of the first light beams 602. In various examples, the lidar sensor 600 has associated therewith a mirror 610, such as mirrors 110, 220, 222, and 410, configured to reflect second light beams 604 toward the second area. Due to the second light beam 604 reflection off the mirror, the second light beams 604 indirectly reflect off surfaces 612 associated with the second area. The second light beams 604 travel from the sensor 600, reflect off the mirror 610, and then reflect off the surface 612 (e.g., indirect reflection).

In various examples, second lidar returns 614 travel from the surface 612 to the sensor 600 after reflection off the mirror 610. In various examples, the sensor 600 is calibrated to determine second sensor data based on the second lidar returns 614. The second sensor data includes a location associated with the surface 612, a location associated with a second object in the area, a movement associated with the object, and the like. The second sensor data includes point clouds including depths associated with the objects and/or the surface 612. In various examples, the sensor 600 (or computing system thereof) determines the second sensor data by applying one or more second equations to the second lidar returns 614. The second equation(s) include a function of the speed of light, an angle of orientation of the sensor 600, a distance ($D_1$) between the sensor 600 and the mirror 610, a distance ($D_2$) between the sensor and the surface 612, a distance ($D_3$) between the mirror 610 and the surface 612, and/or other factors associated with the sensor 600.

In various examples, the sensor 600 determine the second sensor data based on the second equation(s) (e.g., utilizing the second equation(s)) based on an arc (illustrated as O) associated with the second light beams 604. In some examples, the arc may be pre-programmed into lidar sensor 600. For example, the lidar sensor 600 determines that emissions from 340 to 0 degrees are associated with the mirror 610. Accordingly, the lidar sensor 600 receives second lidar returns 614 associated with second light beams 604 emitted between 340 and 0 degrees and processes the second lidar returns 614 based on the second equation(s). The lidar sensor 600 then receives first lidar returns 608 outside of the arc (e.g., any other arc from 0 to 339 degrees) and processes the first lidar returns 608 based on the first equation(s).

In some examples, the lidar sensor 600 is configured to determine the arc (θ) during operation. In such examples, the lidar sensor 600 receives a lidar return 614(1) substantially indicating the distance $D_1$ between the sensor 600 and the mirror 610. A substantial indication of the distance $D_1$ includes a distance within a threshold (e.g., +/−2 centimeters, +/−5 inches, etc.). In some examples, the lidar sensor 600 determines, based on the distance $D_1$, that the lidar return 614(1) is reflecting off an edge (e.g., surface) of the mirror (e.g., a border, a frame, a non-mirrored surface, etc.) directly back to the lidar sensor 600. In some examples, the direct reflection from the mirror at substantially the distance $D_1$ indicates to the lidar sensor 600 an edge of the mirror 610. In such examples, the lidar sensor 600 determines the second sensor data based on the second equation(s). In various examples, the lidar sensor 600 continues to apply the second equation(s) to the second lidar returns 614 until receiving another lidar return 614(2) indicating substantially the distance $D_1$. In such examples, the other lidar return 614(2) indicates a second edge of the mirror 610. In various examples, based on a determination that the other lidar return 614(2) indicates the second edge (e.g., end of the mirror), the lidar sensor 600 determines to apply the first equation(s) to subsequently received lidar returns (e.g., first lidar returns 608, lidar returns reflected directly off a surface, etc.).

Figure 7:
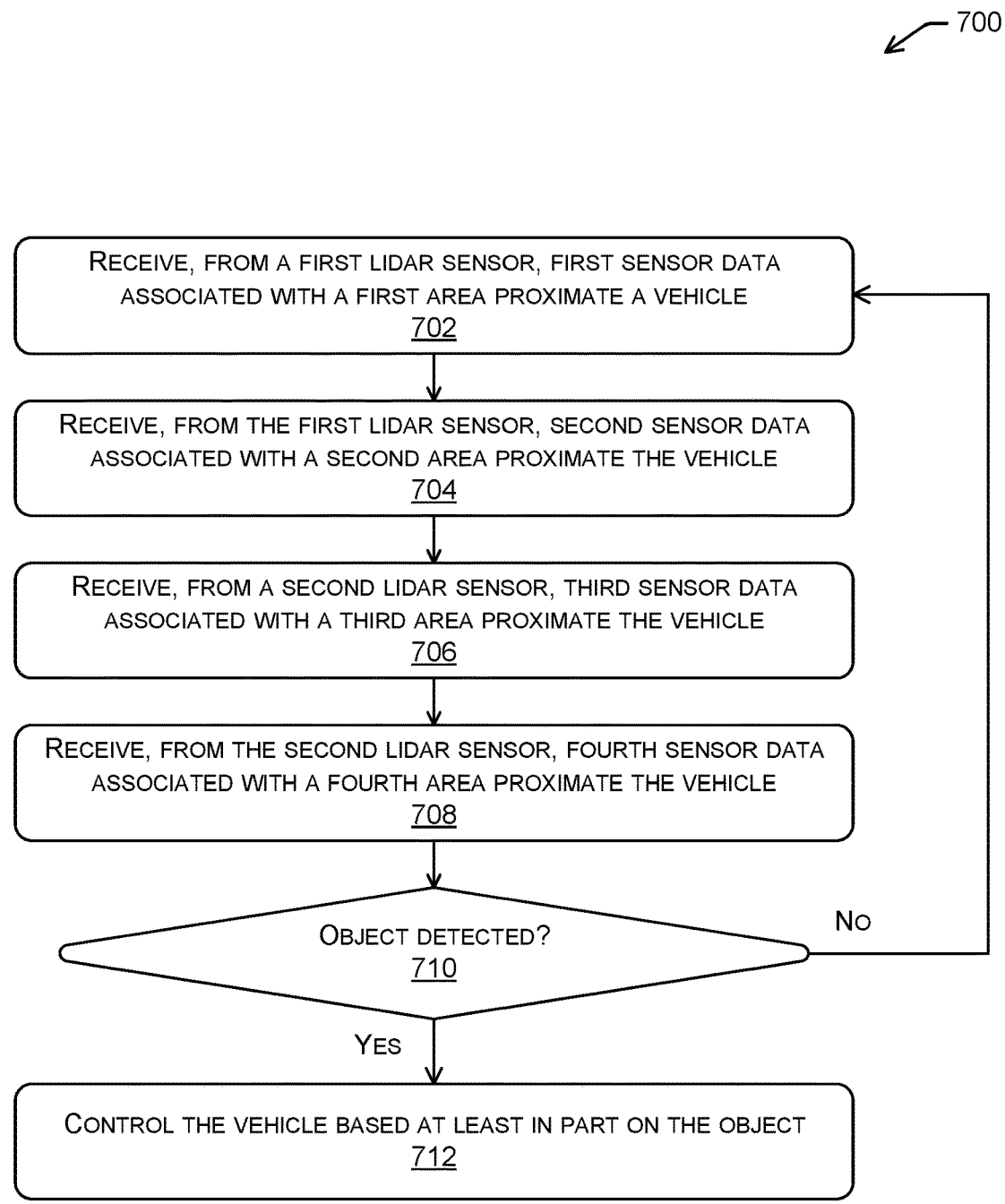
FIG. 7 is a flow chart depicting a method for determining an object proximate a vehicle based on sensor data, in accordance with examples of this disclosure.

FIG. 7 is a flow chart depicting a method for determining an object proximate a vehicle based on sensor data, in accordance with examples of this disclosure. The example method 700 is illustrated as a collection of steps in a logical flow diagram, which represents operations that can be implemented in hardware, software, or a combination thereof. In the context of software, the steps represent computer-executable instructions stored in memory. When such instructions are executed by, for example, a vehicle computing device 504, such instructions may cause the one or more controllers, and/or various components of a vehicle 502 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 700 is described with reference to the system 500 and/or the vehicle 502 of FIG. 5. For example, unless otherwise noted below, the method 700 is described with respect to one or more processors, the planning component 520, and/or other components of the vehicle computing device 504.

With reference to FIG. 7, at 702 the vehicle computing device receives, from a first lidar sensor, first sensor data associated with a first area proximate the vehicle. In some examples, the first area includes an area extending a first distance (e.g., 5 meters, 7 meters, 10 feet, 15 feet, etc.) ahead of or behind the vehicle. The first distance may be based on a type of the vehicle, a speed of the vehicle, an operating environment (e.g., on a paved road, on a dirt road, in a wooded environment, in a field, etc.), or other factors. In various examples, the first distance may be based in part on an orientation angle associated with the first sensor. In such examples, the first sensor is coupled to the vehicle at the orientation angle, such as to emit light beams the first distance from the vehicle. In various examples, the first distance and/or orientation angle is determined based in part on a height of the first sensor above a surface over which the vehicle travels. In various examples, the first sensor data is determined based on one or more first equations.

At 704, the vehicle computing device receives, from the first lidar sensor, second sensor data associated with a second area proximate the vehicle. In some examples, the second area may extend a second distance to one or more sides (e.g., right side, left side) of the vehicle. In some examples, the second area encompasses an area occluded or otherwise blocked by the vehicle (e.g., vehicle frame, bumper, etc.). In such examples, the second area, such as area 412 is represented by the second sensor data. In various examples, the second sensor data is determined based on light beams and associated returns reflected off a first mirror (or first mirror array) associated with the first lidar sensor.

In some examples, the second sensor data is determined based on one or more second equations. In such examples, the second equation(s) are determined as a function of one or more of the speed of light, a distance between the first sensor and the second area, a distance between the first mirror and the second area, and/or a distance between the first sensor and the first mirror.

At 706, the vehicle computing device receives, from a second lidar sensor, third sensor data associated with a third area proximate the vehicle. In some examples, the third area includes an area extending a third distance (e.g., 4 meters, 6 meters, 12 feet, 18 feet, etc.) ahead of or behind the vehicle (e.g., opposite of the first area). The third distance may be the same or different from the first distance and the second distance. In various examples, the third distance may be based in part on an orientation angle associated with the second sensor. In such examples, the second sensor is coupled to the vehicle at the orientation angle, such as to emit light beams the third distance from the vehicle. In various examples, the third distance and/or orientation angle is based in part on a height of the second sensor above the surface over which the vehicle travels. In various examples, the third sensor data is determined based on the first equation(s).

At 708, the vehicle computing device receives, from the second lidar sensor, fourth sensor data associated with a fourth area proximate the vehicle. In some examples, the fourth area extends a fourth distance to a side (e.g., right side, left side) of the vehicle. In some examples, the fourth area includes a side of the vehicle opposite the second area. In some examples, the fourth area encompasses an area occluded or otherwise blocked by the vehicle (e.g., vehicle frame, bumper, etc.). In such examples, the fourth area, such as area 412 may be represented by the fourth sensor data. In various examples, the fourth sensor data is determined based on light beams and associated returns reflected off a second mirror (or second mirror array) associated with the second lidar sensor.

In some examples, the fourth sensor data is determined based on one or more third equations. In such examples, the third equation(s) include a function of one or more of the speed of light, a distance between the second sensor and the fourth area, a distance between the second mirror and the fourth area, and/or a distance between the second sensor and the second mirror. In some examples, the second equation(s) and the third equation(s) may be the same or similar equations.

At 710, the vehicle computing device determines whether an object is detected in at least one of the first area, the second area, the third area or the fourth area. The object may include a static or dynamic object. In various examples, the vehicle computing system determines a location and/or movement associated with object.

As shown in FIG. 7, based at least in part on determining that no object is detected ("No" at operation 710), the vehicle computing system receives additional sensor data from the first sensor and the second sensor, such as that described with regard to operation 702. Based at least in part on determining that an object is detected ("Yes" at operation 710), the vehicle computing system, at 712, controls the vehicle based at least in part on the object. The vehicle computing system determines one or more trajectories associated with vehicle travel through the environment based in part on the object. In some examples, the vehicle computing system emits one or more warning signals to alert the object of vehicle operation. By detecting objects and controlling the vehicle based in part on the objects, the vehicle computing device optimize the safe operation of the vehicle, whether while operating autonomously or manned, as operators of vehicles may not detect the objects and/or may not detect the objects in time to avoid them.

INDUSTRIAL APPLICABILITY

The present disclosure provides systems and methods for increasing a field of view of a lidar sensor. In particular, the systems and methods of the present disclosure utilize mirrors 110 to reflect otherwise unused light beams (second light beams 122) from a lidar sensor 104 to expand an area covered by the lidar sensor 104. The various systems and methods described herein may be used to decrease a total number of lidar sensors 104 on an autonomous vehicle 102, thereby reducing overall system complexity. By reducing the number of lidar sensors 104, a total amount of data processed by a vehicle computing device 504 (e.g., vehicle computing device 504) may be reduced, thereby increasing an amount of processing power and memory available thereto. Accordingly, the present disclosure improves the operation of the vehicle computing device 504, as well as overall system efficiency.

As noted above with respect to FIGS. 1-7, an example sensor system of an autonomous vehicle 102 includes a first lidar sensor 104 oriented to capture sensor data representative of a first area 106 proximate the autonomous vehicle 102. For example, the first area 106 includes an area in front of the autonomous vehicle 102. The autonomous vehicle 102 includes one or more first mirrors 110(1) configured to reflect light beams 122 emitted by the first lidar sensor 104(1) in a direction opposite the first area 106. The first mirror(s) 110(1) reflect the light beams 122 toward a second area 108 proximate the vehicle 102 and reflect lidar returns 126 from the second area 108. For example, the second area 108 include a first side (e.g., left side) of the vehicle 102.

The first lidar sensor 104(1) generates first sensor data based on first lidar returns 124 associated with the first area 106 and second lidar returns 126 associated with the second area 108, the second returns received as a reflection via the first mirror 110(1). The lidar system 100 includes a second lidar sensor 104(2) oriented to capture sensor data representative of a third area and a second mirror 110(2) configured to reflect pulses of light from the second lidar sensor toward a fourth area. For example, the third area includes an area behind the autonomous vehicle 102 and the fourth area may include a second side (e.g., right side) of the autonomous vehicle 102. The second lidar sensor 104(2) generates second sensor data based on third returns associated with the third area and fourth returns associated with the fourth area,
the fourth returns received as a reflection via the second mirror. Accordingly, the example lidar system 100 is configured to generate sensor data associated with the first, second, third, and fourth areas representative of the area surrounding the vehicle 102 (e.g., front, rear, and both sides) utilizing two lidar sensors 104(1) and 104(2), unlike traditional sensor systems that required at least four lidar sensors 104 to cover an equivalent area.

A vehicle computing device 504 associated with the autonomous vehicle 502 processes the first sensor data and the second sensor data to determine an action to take. Due in part on the reduced number of sensor systems (e.g., two instead of four), the vehicle computing device 504 processes data from fewer sources, thereby increasing an amount of processing power and/or memory available to the vehicle computing device 504. The increased amount of processing power and/or memory decrease a speed required to determine the action to take. The action includes determining a trajectory associated with the vehicle 502, such as to accomplish a goal (e.g., navigate to destination), avoid one or more objects proximate the vehicle, or the like. Thus, the example systems and methods described above reduce a total number of lidar sensors required to operate an autonomous vehicle, decreasing overall system cost and complexity and increasing overall system efficiency.

While aspects of the present disclosure have been particularly shown and described with reference to the embodiments above, it will be understood by those skilled in the art that various additional embodiments are contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A vehicle, comprising:
   a first lidar sensor configured to:
      emit first light beams toward a first area proximate the vehicle;
      emit second light beams away from the first area;
      receive one or more first returns associated with the first light beams;
      receive one or more second returns associated with the second light beams; and
      generate first sensor data based at least in part on the one or more first returns and the one or more second returns; and
   a first mirror coupled to the vehicle at a location spaced from the first lidar sensor, the first mirror configured to:
      reflect a portion of the second light beams toward a second area proximate the vehicle; and
      reflect the one or more second returns to the first lidar sensor;
   a second lidar sensor configured to:
      emit third light beams toward a third area proximate the vehicle;
      emit fourth light beams away from the third area;
      receive one or more third returns associated with the third light beams;
      receive one or more fourth returns associated with the fourth light beams; and
      generate second sensor data based at least in part on the one or more third returns and the one or more fourth returns; and a second mirror coupled to the vehicle at a second position spaced from the second lidar sensor, the second mirror configured to:
reflect a portion of the fourth light beams toward a fourth area proximate the vehicle; and
reflect the one or more fourth returns to the second lidar sensor.

2. The vehicle of claim 1, wherein: the first lidar sensor and the second lidar sensor are coupled to the vehicle along a longitudinal axis of the vehicle; the first mirror is coupled to the vehicle proximate a first corner of the vehicle; and the second mirror is coupled to the vehicle proximate a second corner of the vehicle, the second corner being opposite the first corner, the vehicle further comprising: a third mirror coupled to the vehicle proximate a third corner, the third minor configured to: reflect a second portion of the second light beams toward a fifth area proximate the vehicle; and reflect one or more fifth returns associated with the second portion of the second light beams to the first lidar sensor; and a fourth mirror coupled to the vehicle proximate a fourth corner opposite the third corner, the fourth mirror configured to: reflect a second portion of the fourth light beams toward a sixth area proximate the vehicle; and reflect one or more sixth returns of the second portion of the fourth light beams to the second lidar sensor, wherein an area surrounding the vehicle comprises the first area, the second area, the third area, the fourth area, the fifth area, and the sixth area.

3. The vehicle of claim 1, wherein:
generating the sensor data comprises:
applying a first set of equations to the one or more first returns; and
applying a second set of equations to the one or more second returns.

4. The vehicle of claim 1, further comprising:
one or more processors; and
one or more computer-readable media storing instructions that, when executed by the one or more processors, cause the one or more processors to perform operations comprising:
receiving, from the lidar sensor, the sensor data comprising depth information associated with at least one of a surface or an object associated with at least one of the first area or the second area; and
controlling the vehicle based at least in part on the sensor data.

5. The vehicle of claim 1, wherein the lidar sensor is coupled to the vehicle at:
a first location associated with a longitudinal axis of the vehicle; or
a second location associated with a corner of the vehicle.

6. The vehicle of claim 1, wherein:
the lidar sensor is coupled to the vehicle at a first height relative to the vehicle; and
the mirror is coupled to the vehicle at a second height relative to the vehicle, the second height being greater than the first height.

7. The vehicle of claim 1, wherein the location of the mirror is a distance from the lidar sensor, the distance being within a range between 10 and 100 centimeters.

8. A vehicle comprising:
a first lidar system comprising:
a first lidar sensor configured to emit a plurality of light beams in a cyclical pattern about a vertical axis of the first lidar sensor and oriented to emit first light beams of the plurality of light beams toward a first area proximate the vehicle;
a first mirror coupled to the vehicle at a position spaced from the first lidar sensor and configured to reflect a portion of the plurality of light beams toward a second area proximate the vehicle, the second area being different from the first area; and
a computing system configured to generate sensor data associated with the first area and the second area; and,
a second lidar system comprising:
a second lidar sensor oriented to emit third light beams toward a third area and fourth light beams away from the third area proximate the vehicle; and
a second mirror located at a second position spaced from the second lidar sensor and configured to reflect a portion of the fourth light beams toward a fourth area proximate the vehicle,
wherein an area surrounding the vehicle comprises the first area, the second area,
the third area, and the fourth area.

9. The vehicle of claim 8, further comprising:
one or more processors; and
one or more computer-readable media storing instructions that, when executed by the one or more processors, cause the one or more processors to perform operations comprising:
receiving, from the lidar sensor, the sensor data associated with the first area and the second area; and
controlling the vehicle based at least in part on the sensor data.

10. The vehicle of claim 9, the operations further comprising:
determining, based at least in part on the sensor data, an object located in at least one of the first area, or the second area,
wherein controlling the vehicle is based at least in part on the object.

11. The vehicle of claim 10, further comprising an emitter comprising at least one of a speaker or a light, the operations further comprising:
causing a warning signal to be emitted via the emitter based at least in part on the object.

12. The vehicle of claim 8, wherein:
the lidar sensor is coupled to the vehicle:
proximate a corner of the vehicle; or
along a longitudinal axis of the vehicle; and
the mirror is coupled to the vehicle proximate the corner of the vehicle.

13. The vehicle of claim 8, wherein the first area is substantially in front of or behind the vehicle and the second area is at least one of:
on a side of the vehicle;
proximate a bumper of the vehicle; or
proximate a wheel of the vehicle.

14. The vehicle of claim 8, wherein the mirror is a first mirror, the position is a first position, and the portion of the plurality of light beams is a first portion, the vehicle further comprising:
a second mirror coupled to the vehicle at a second position spaced from the lidar sensor and configured to reflect a second portion of the plurality of light beams toward a third area proximate the vehicle, the third area being different from the first area and the second area,
wherein the computing system is configured to generate sensor data associated with the first area, the second area, and the third area.

15. A method, comprising:

receiving, from a first lidar sensor, first sensor data associated with a first area proximate a vehicle, the first sensor data generated based on first light beams emitted toward the first area;

receiving, from the first lidar sensor, second sensor data associated with a second area proximate the vehicle, the second sensor data generated based on second light beams emitted in a direction not associated with the first area and reflected off a first mirror located a first distance from the first lidar sensor;

receiving, from a second lidar sensor, third sensor data associated with a third area proximate the vehicle, the third sensor data generated based on third light beams emitted toward the third area;

receiving, from the second lidar sensor, fourth sensor data associated with a fourth area proximate the vehicle, the fourth sensor data generated based on fourth light beams emitted in a direction not associated with the third area and reflected off a second mirror located a second distance from the second lidar sensor; and determining an object proximate the vehicle based at least in part on at least one of the first sensor data, the second sensor data, the third sensor data, or the fourth sensor data.

16. The method of claim 15, further comprising controlling the vehicle based at least in part on the object.

17. The method of claim 15, further comprising:

determining a classification associated with the object; and emitting a warning signal based at least in part on the classification.

18. The method of claim 15, further comprising:

determining that the object represents a boundary associated with a path of the vehicle;

determine a trajectory associated with the vehicle based at least in part on the boundary; and control the vehicle based at least in part on the trajectory.

* * * * *